United States Patent
Köpfer et al.

(10) Patent No.: US 11,578,709 B2
(45) Date of Patent: Feb. 14, 2023

(54) SMA-BASED DISCRETE ACTUATOR

(71) Applicant: ACTUATOR SOLUTIONS GMBH, Gunzenhausen (DE)

(72) Inventors: Markus Köpfer, Stoedtlen-Regelsweiler (DE); Matthias Peterreins, Gunzenhausen (DE); Markus Kagerer, Ettenstatt (DE)

(73) Assignee: ACTUATOR SOLUTIONS GMBH, Gunzenhausen (DE)

( * ) Notice: Subject to any disclaimer, the term of this patent is extended or adjusted under 35 U.S.C. 154(b) by 0 days.

(21) Appl. No.: 17/777,356

(22) PCT Filed: Dec. 18, 2020

(86) PCT No.: PCT/EP2020/087282
§ 371 (c)(1),
(2) Date: May 17, 2022

(87) PCT Pub. No.: WO2021/123353
PCT Pub. Date: Jun. 24, 2021

(65) Prior Publication Data
US 2022/0412325 A1   Dec. 29, 2022

(30) Foreign Application Priority Data
Dec. 20, 2019 (IT) .......................... 102019000025057

(51) Int. Cl.
*F03G 7/06* (2006.01)
(52) U.S. Cl.
CPC .......... *F03G 7/0631* (2021.08); *F03G 7/064* (2021.08); *F03G 7/06143* (2021.08)

(58) Field of Classification Search
CPC ..... F03G 7/0631; F03G 7/06143; F03G 7/064
USPC .............................. 60/527–529; 310/306–307
See application file for complete search history.

(56) References Cited

U.S. PATENT DOCUMENTS

| 4,684,913 A * | 8/1987 | Yaeger .................. G11B 21/21 60/527 |
| 2002/0069941 A1 | 6/2002 | Narasimhiah et al. |
| 2005/0160858 A1 | 7/2005 | Mernoe |
| 2014/0060036 A1 * | 3/2014 | Gao ......................... F01P 7/10 60/527 |

(Continued)

FOREIGN PATENT DOCUMENTS

WO    WO-2019097437 A1    5/2019

OTHER PUBLICATIONS

International Search Report and Written Opinion dated Mar. 30, 2021 in PCT/EP2020/087282 (12 pages).

(Continued)

*Primary Examiner* — Hoang M Nguyen
(74) *Attorney, Agent, or Firm* — Element IP, PLC

(57) ABSTRACT

The present application relates to a stepwise discrete actuator (10) with two shape memory alloy wires (15, 15') used in an antagonistic configuration to drive a slider (13) that moves a toothed element (12) through tooth-engaging fingers (131, 132) that are spaced at rest by a distance F that is shorter than the distance T between adjacent teeth by an amount sufficient for a stationary finger lifter (14) to lift that of the slider fingers (131, 132) that does not engage the movable toothed element (12) such that it clears the teeth of the latter.

13 Claims, 11 Drawing Sheets

(56) References Cited

U.S. PATENT DOCUMENTS

2014/0202148 A1* 7/2014 Kopfer .................. F03G 7/065
                                                   60/527
2020/0350675 A1* 11/2020 Brobston ............... H01Q 21/08

OTHER PUBLICATIONS

Italian Search Report and Written Opinion dated Sep. 1, 2020 in Italian Patent Application No. 201900025057, 7 pages.

* cited by examiner

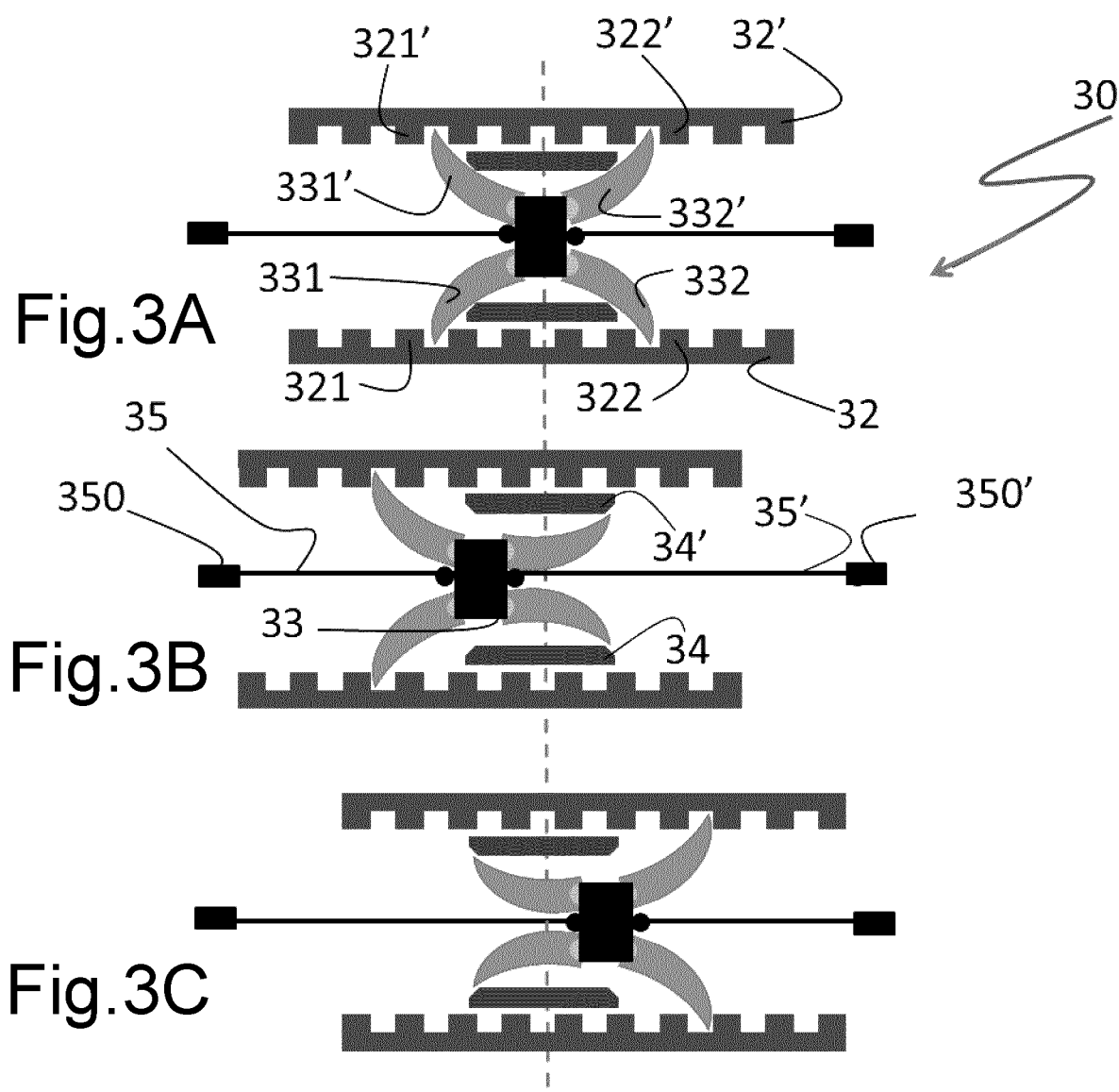

SMA-BASED DISCRETE ACTUATOR

The present invention is inherent to a Shape Memory Alloy (SMA)-based stepwise discrete actuator with at least two shape memory alloy wires used in an antagonistic configuration.

Generally speaking, actuators based on shape memory alloy wires present various advantages such as low encumbrance, weight, power consumption, all of the above leading to the possibility of achieving high degrees of miniaturization and/or ease of integration in more complex systems/devices.

Some examples of recent SMA wire-based actuators are shown in the US patent application 2005/0160858 and the U.S. Pat. No. 7,364,211. All of these references suffer from the drawback that a kind of separately controlled mechanical lock is required.

Some other examples of actuators using SMA wires in antagonistic configuration are given in the US patent application 2019/0288391 and in the international patent application WO 2019/119454, and in both cases power needs to be supplied to keep the actuator in the new position. Also these solutions suffer from an overall limitation of stroke/displacement since depending on the length of the shape memory alloy wire.

A continuous actuator capable of self-locking using SMA wires in an antagonistic configuration is described in the international patent application WO 2020/183360 in the applicant's name.

Purpose of the present invention is to provide an actuator capable to move an element in discrete steps that requires a higher power supply only during an actuator status change, but requires much less power to keep the actuator in the new position, and in some preferred embodiments no power, and in a first aspect thereof consists in a stepwise discrete actuator comprising:

a stationary support a movable toothed element with a constant tooth pitch defining the actuator discrete steps, a slider for moving the movable toothed element through two fingers that engage the movable toothed element, the slider being one-way bendable, a stationary finger lifter, a couple of shape memory alloy wires in antagonistic configuration for driving the slider, wherein the stationary support is coupled to the movable toothed element by means of releasable locking structures having a constant spacing equal to said step distance, and wherein the slider fingers distance at rest is sufficiently shorter than the distance between the engageable teeth to allow the lifting of the slider fingers by the finger lifter.

Figure 1:
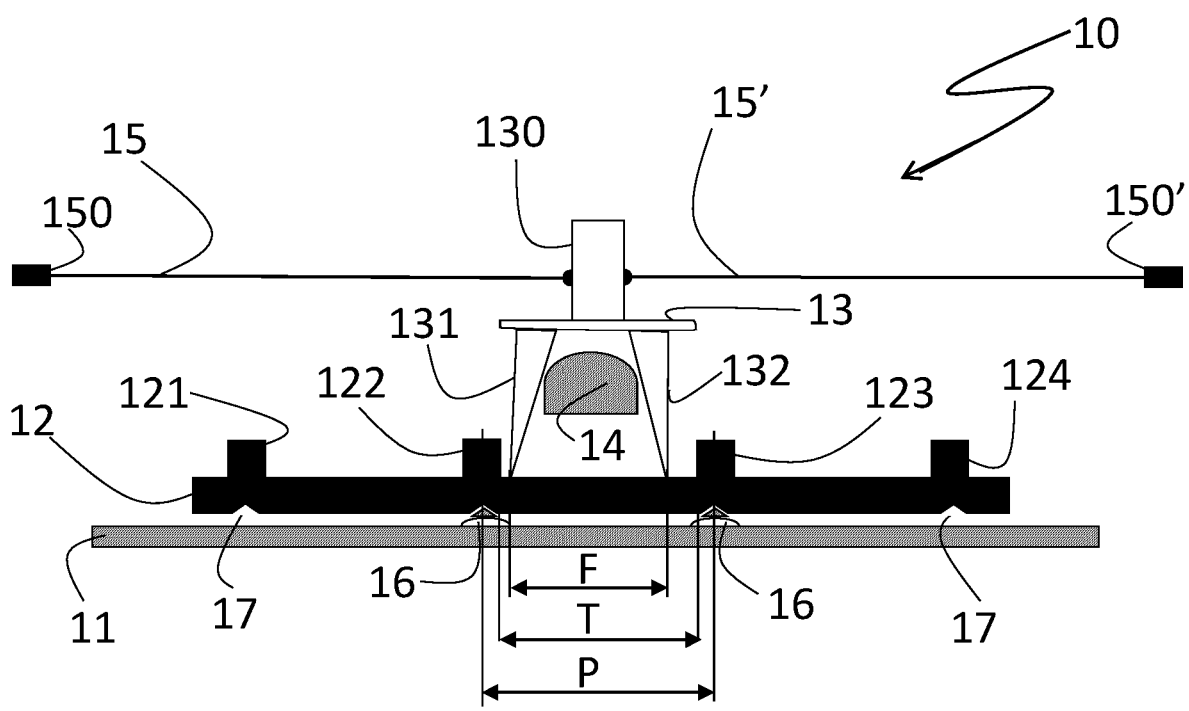
Figure 4:
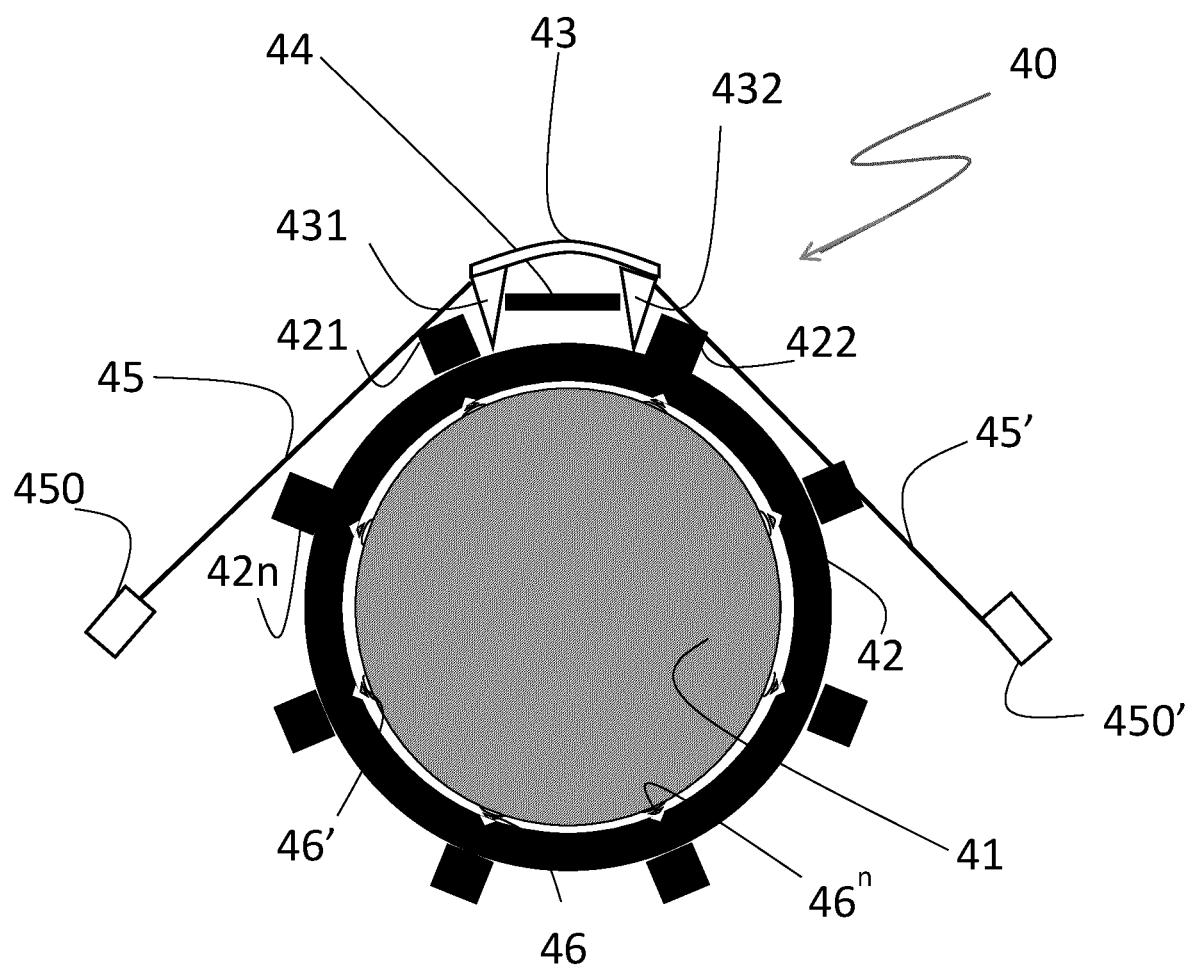
Figure 5A:
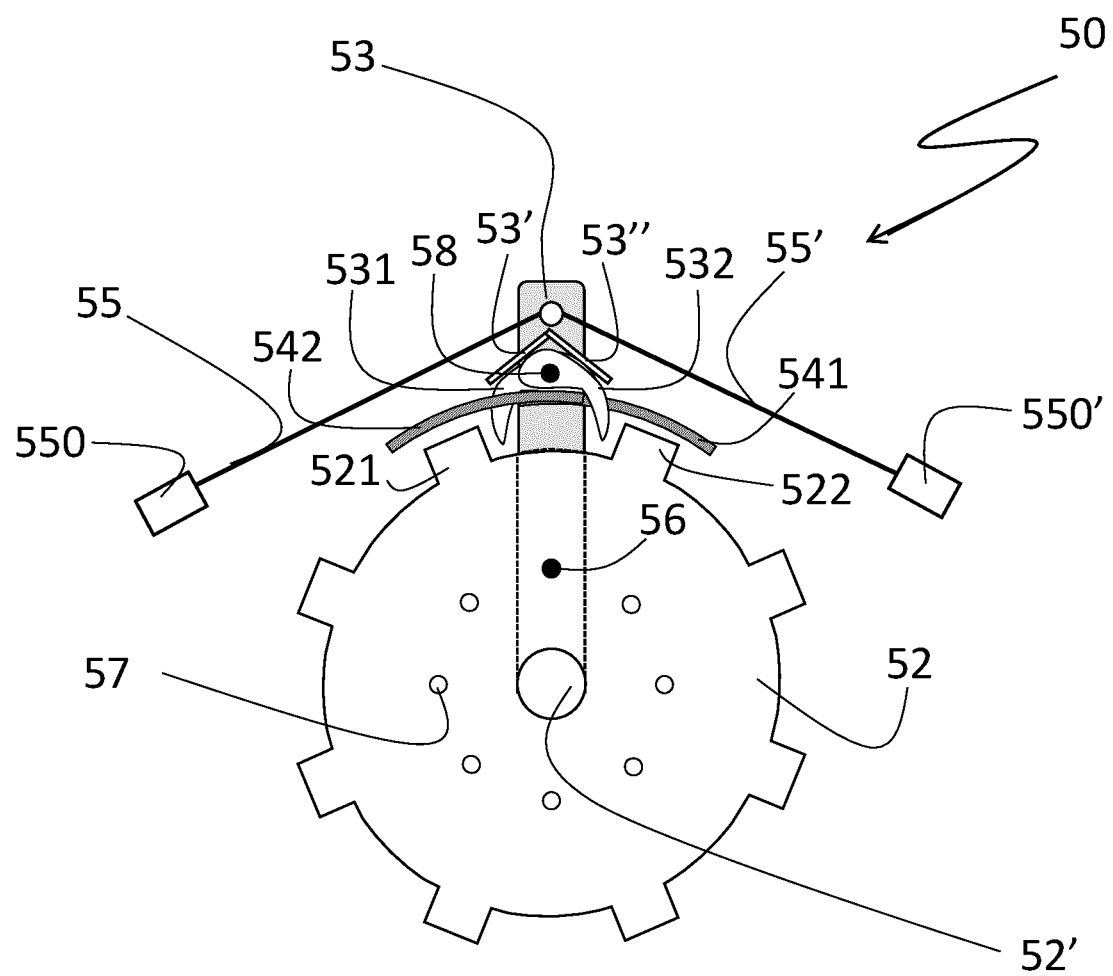
Figure 5B:
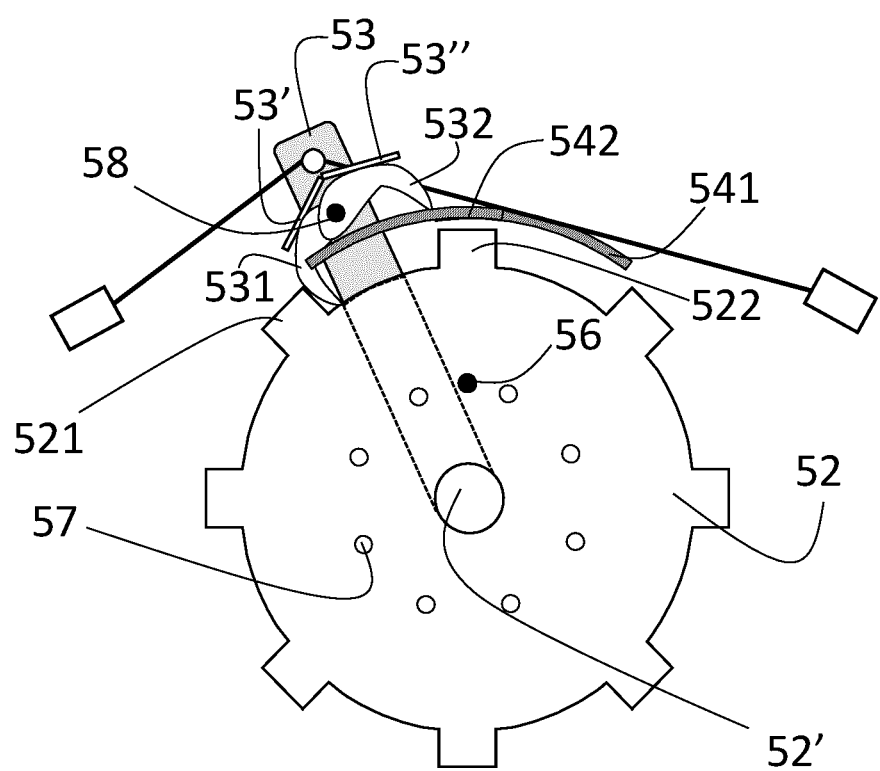
Figure 5C:
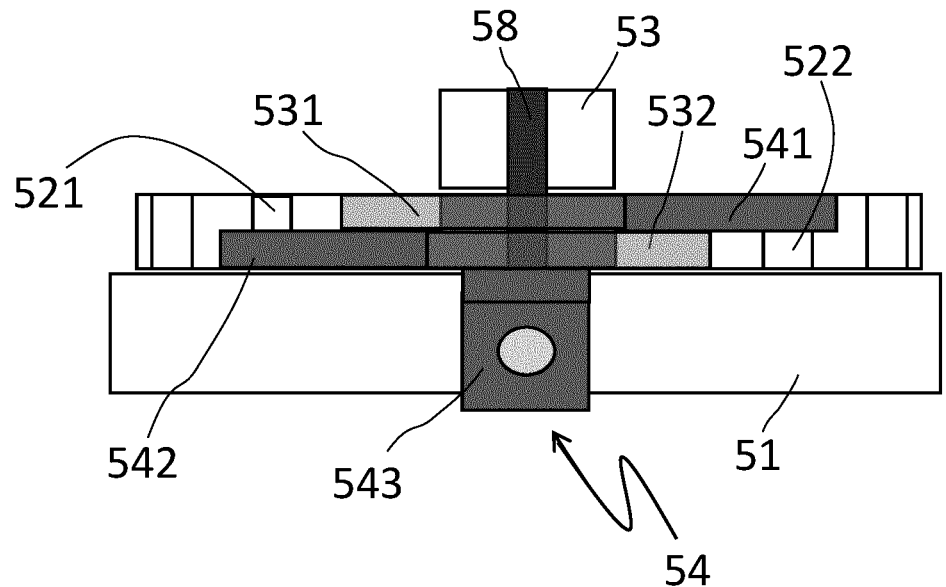
Figure 5D:
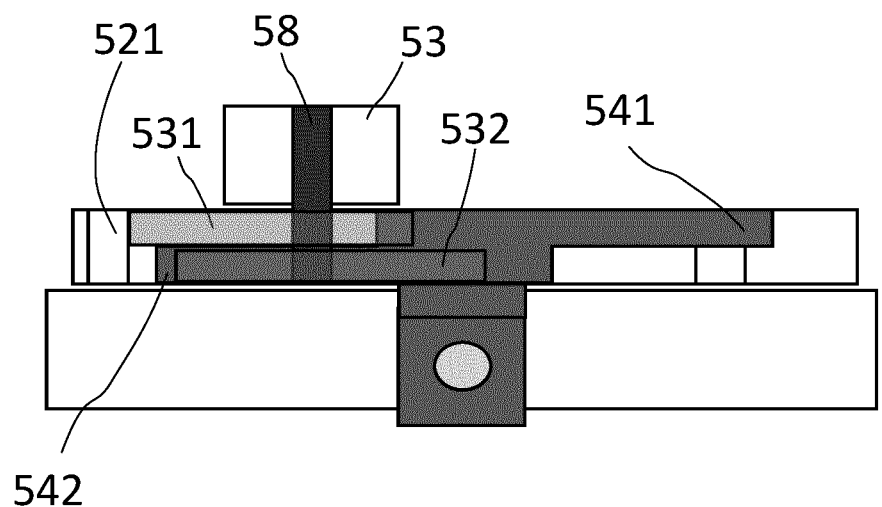
Figure 6A:
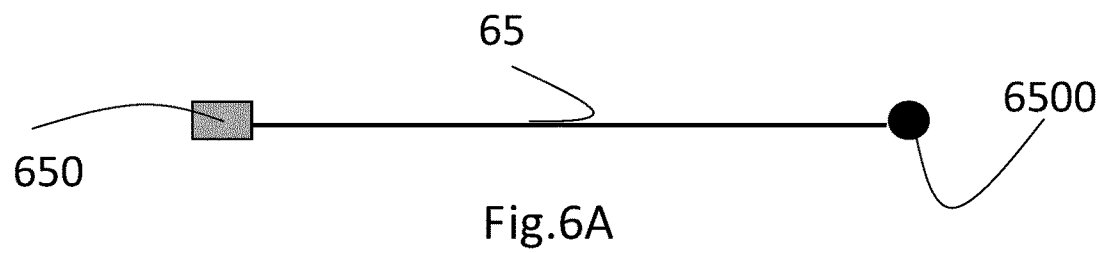
Figure 6B:
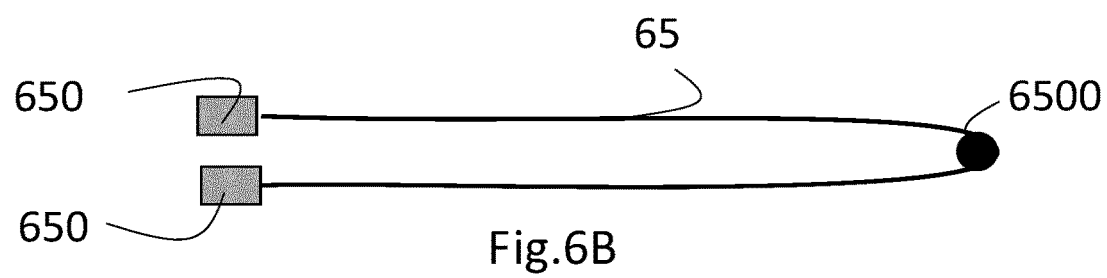
Figure 6C:
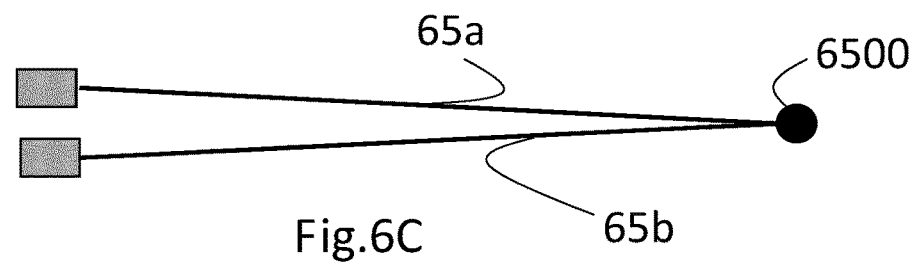
Figure 6D:
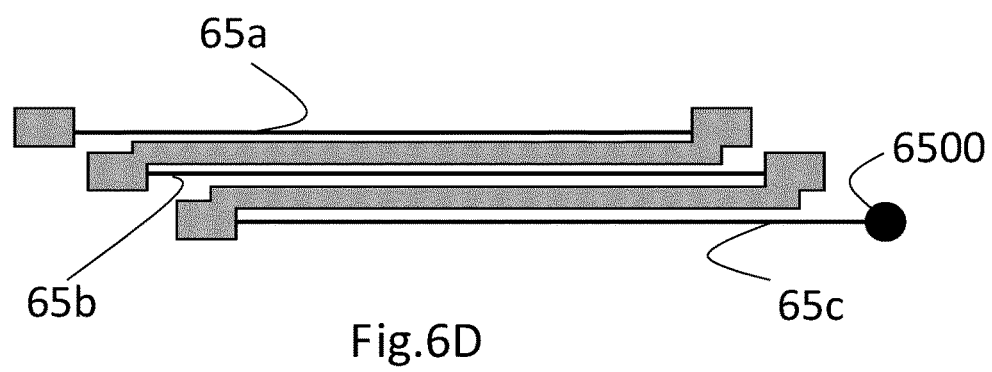
Figure 7A:
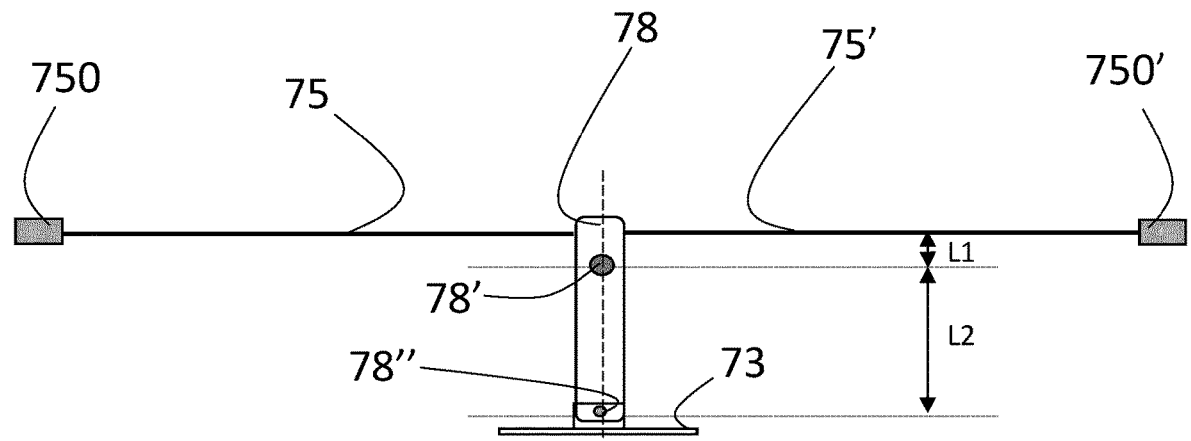
Figure 7B:
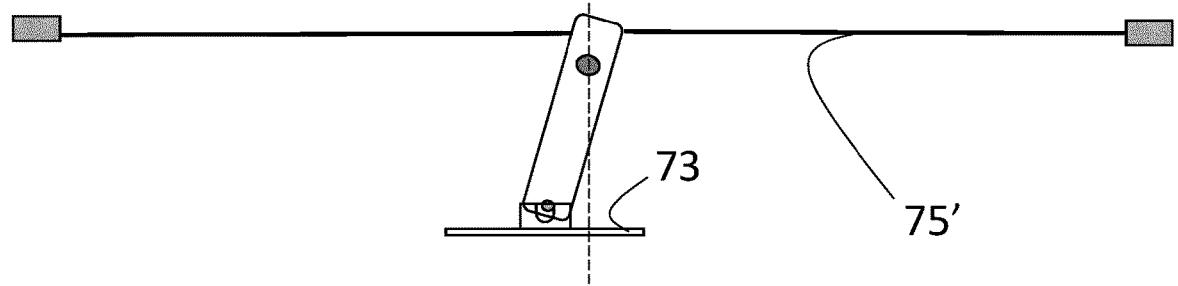
Figure 8A:
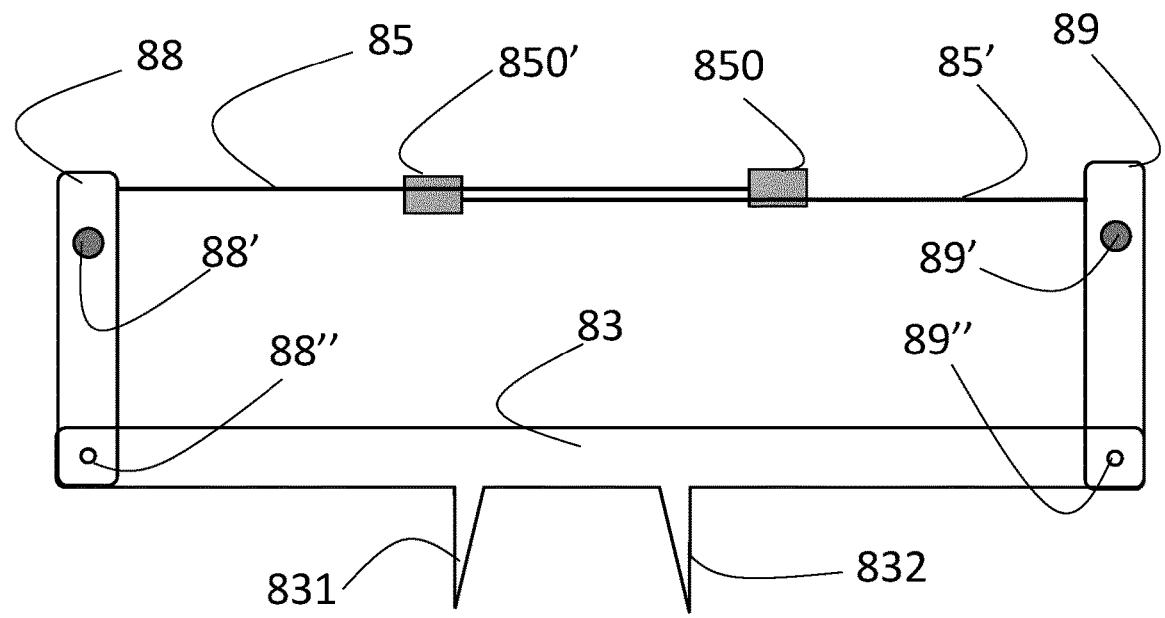
Figure 8B:
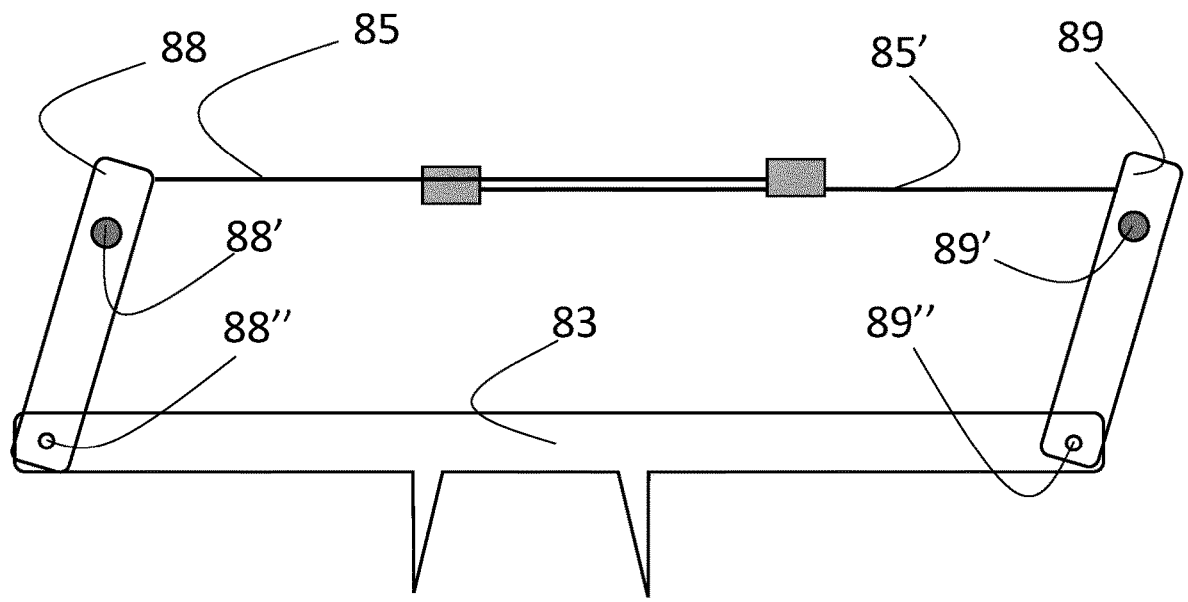
Figure 9A:
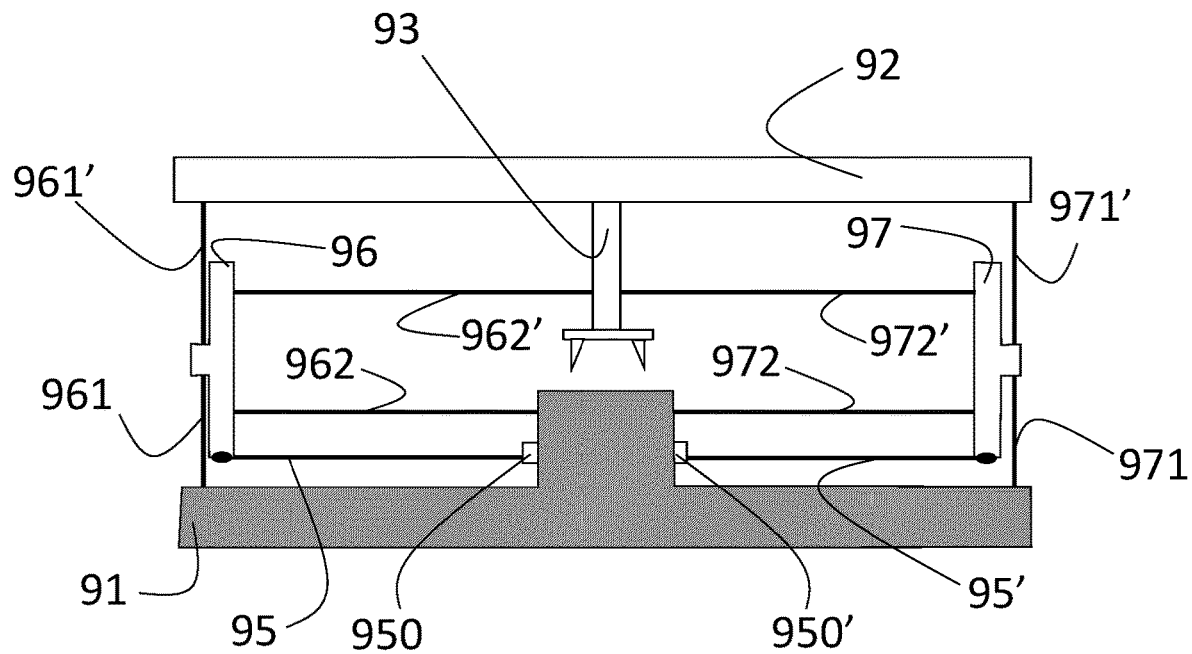
Figure 9B:
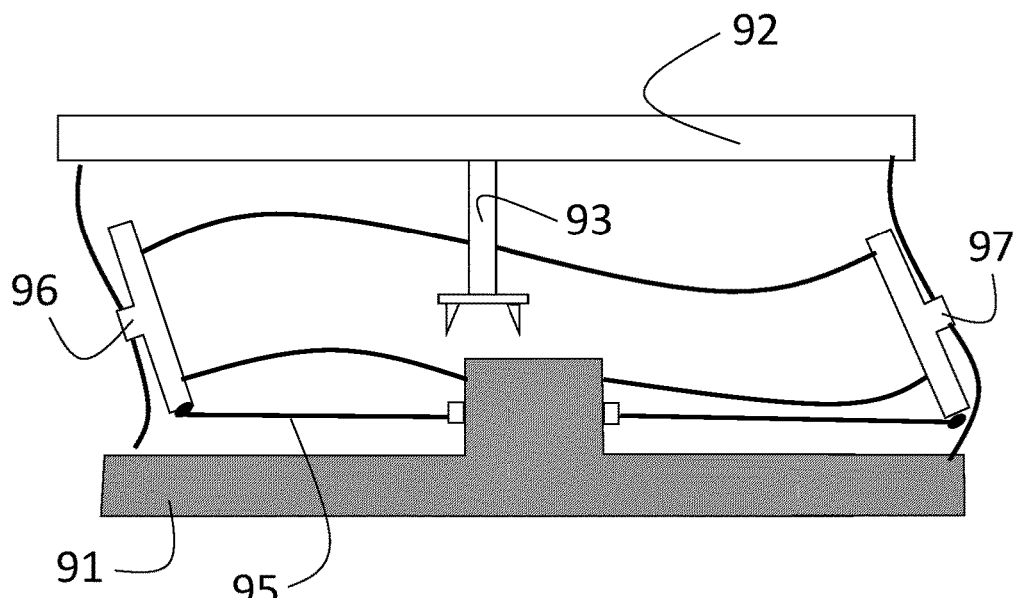

The invention will be further illustrated with the help of the following figures where:

FIG. 1 is schematic a cross-sectional view of an actuator according to a first embodiment of the present invention, FIGS. 2A-2E show schematic cross-sectional views of the actuator represented in FIG. 1 in different actuation statuses, FIGS. 3A-3C show schematic cross-sectional views of an actuator according to a second embodiment of the present invention in different actuation statuses, FIG. 4 is a schematic cross-sectional view of an actuator according to a third embodiment of the present invention, FIGS. 5A-5D show schematic cross-sectional views and top views of an actuator according to a fourth embodiment of the present invention, FIGS. 6A-6D show exemplary shape memory alloy wire configurations for actuators according to the present invention, FIGS. 7A-7B show schematic views of a first exemplary alternative connection between the shape memory alloy wires and the slider, FIGS. 8A-8B show schematic views of a second exemplary alternative connection between the shape memory alloy wires and the slider, FIGS. 9A-9B show schematic views of a third exemplary alternative connection between the shape memory alloy wires and the slider.

In the figures the size and the dimensional ratios of the various elements shown in some cases have been altered in order to help understanding the drawings, with particular but not exclusive reference to the SMA wire diameter with respect to other elements of the actuator, and also some ancillary elements not necessary for the invention understanding, such as current supply source, actuator case/enclosure, etc. have not been shown since they are ordinary means known in the technical field.

The present invention employs shape memory alloy wires as active elements, in this regards it is known that shape memory alloys are characterized by a structural transition between two phases, namely the so-called Martensite phase which is stable at a lower temperature, and the so-called Austenite phase, which is stable at a higher temperature. A shape memory alloy is therefore characterized by four temperatures, Mf, Ms, As, Af where Mf is the temperature below which the shape memory alloy is fully in the Martensite phase, i.e. it has a martensitic structure, Af is the temperature above which the shape memory alloy is fully in the Austenite phase, i.e. it has an austenitic structure, Ms is the temperature below which the transition from Austenite to Martensite starts and As is the temperature above which the transition from Martensite to Austenite starts. Wires made of a shape memory alloy can be trained to change their shape when temperature changes from below Mf to above As, and vice-versa. Processing and training of SMA wires are widely known procedures in the field, as exemplified by the paper "Shape Memory Alloy Shape Training Tutorial" dating back to the Fall 2004 training section "ME559—Smart Materials and Structures".

The present invention uses shape memory alloy wires in antagonistic configuration to impart the desired slider displacement, in this regards the more the shape memory alloy wires are in their Austenite phase (high temperature) with respect to Martensite (low temperature) the higher the traction they will apply. Details of operating principles of shape memory alloy wires are widely known to a person of ordinary skill in the art, see for example the paper "Fundamental characteristics and design method for nickel-titanium shape memory", published in 2001 on PERIODICA POLYTECHNICA SER. MECH. ENG. VOL. 45, NO. 1, PP. 75-86, while more details on control of antagonistic shape memory alloy wires can be found for example, in the article "Design and Control of a Shape Memory Alloy Actuator for Flap Type Aerodynamic Surfaces" published on the Preprints of the 18th IFAC World Congress, Milano (Italy) Aug. 28-Sep. 2, 2011.

As explained above, a wire brought in the austenitic state, i.e. at a temperature comprised between As and Af, will shorten thus exerting a force on the slider pulling it in the contraction direction, while the other SMA wire is in the martensitic state, i.e. at a temperature comprised between Ms and Mf. The shape memory alloy wires will be alternatively brought at such actuation temperature, initially to drive the slider for pushing the movable toothed element and then to bring back the slider to its rest position, while leaving the movable toothed element in the new position, such that once the slider is back in the central/rest position they will be both in the martensitic state.

A schematic cross-sectional view of an actuator 10 according to a first embodiment of the present invention is shown in FIG. 1.

Actuator 10 comprises a stationary support 11, coupled to a movable toothed element, in this case a toothed rack 12, wherein coupling is achieved by means of releasable locking structures represented by indentations 17 formed on the toothed rack 12 into which spring-loaded pins 16 fixed on the stationary support 11 (only two shown) engage to retain the movable toothed rack 12. The constant spacing of said locking structures 16, 17 is equal to the tooth pitch P of the toothed rack 12, i.e. the constant distance between the centers of its teeth 121, 122, 123 and 124.

Two engaging fingers 131, 132 of a slider 13 are arranged within the space T between two adjacent teeth of the toothed rack 12. The portion of slider 13 carrying fingers 131, 132 is structured so as to be bendable only in one direction (upward in this case), wherein the bending is caused by the force exerted by one of said fingers 131, 132 when contacting a stationary finger lifter 14 upon moving slider 13 by means of two SMA wires 15, 15' arranged in an antagonistic configuration. More specifically, slider 13 further comprises a pole 130 for fixing a first extremity of each of the two SMA wires 15, 15' while the second extremity is connected through suitable terminals 150, 150' to another stationary element (not shown) of actuator 10.

The movable toothed rack 12 shown in FIG. 1 has four teeth 121, 122, 123, 124 but the present invention is not limited to a specific number of teeth, such number being preferably comprised between 3 and 30, and most usefully comprised between 8 and 25.

It is important to remark that the system needs a releasable locking structure for each discrete step of the movable toothed rack, but this is not limited to having spring-loaded pins 16 fixed onto the stationary support 11 and engaging indentations 17 formed on the movable toothed rack 12 (or vice versa) in correspondence with the teeth, although this is preferred for linear toothed racks. More specifically, the indentations may be offset from the teeth, for example placed between them, or there could be a single indentation being engaged, one at a time, by different spring-loaded pins or vice versa a single spring-loaded pin engaging, one at a time, different indentations (an example of the latter type of coupling will be provided further on).

It is to be underlined that the term "stationary" is to be interpreted in the context of actuators as components or subassemblies of other devices, whereby they may be mounted onto movable elements so that a stationary element is an element fixed with respect to the action of the actuator, i.e. its movable part and its active actuating elements (the shape memory alloy elements). In the most common configurations the stationary elements are embedded or part of the actuator case.

"One-way bendable" in the context of the present invention means that the finger-carrying portion of slider 13 is structured so that it can only deform so as to move away from the toothed rack 12 but not towards it.

The operating principle of the actuator shown in FIG. 1 is further illustrated in FIGS. 2A-2E.

Figure 2A:
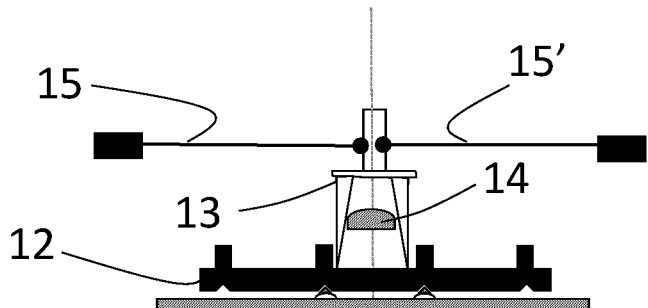

In FIG. 2A actuator 10 is at rest in the starting condition, with the two antagonistic shape memory alloy wires 15, 15' being of equal length.

Figure 2B:
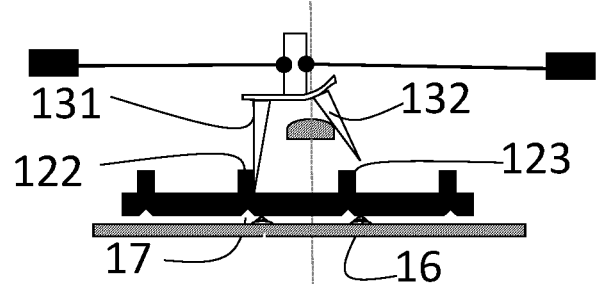

In FIG. 2B the shape memory alloy wire 15 is in a higher actuated state (i.e. hotter), becomes shorter and starts to pull slider 13 towards left, and as a consequence the left engaging finger 131 pushes tooth 122 towards left causing also the release of the locking structures by offsetting the spring-loaded pins 16 and the indentations 17. At the same time, the right engaging finger 132 impinges onto the stationary finger lifter 14 and, thanks to the one-way bendable characteristics of its support, is lifted above tooth 123 and therefore does not interfere with the toothed rack 12 and allows the movement thereof towards left.

Figure 2C:
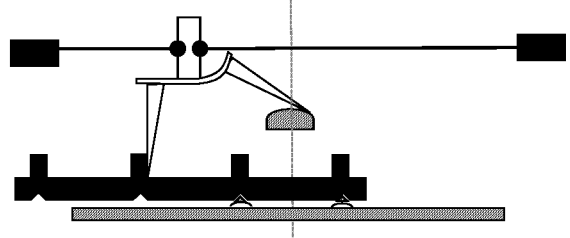

FIG. 2C shows the situation where the movable toothed rack 12 has reached the new equilibrium position. In this situation, the shape memory alloy wire 15 is still at a higher temperature and the locking structures are engaged, meaning that the spring-loaded pins 16 are aligned with indentations 17 of the movable toothed rack 12.

Figure 2D:
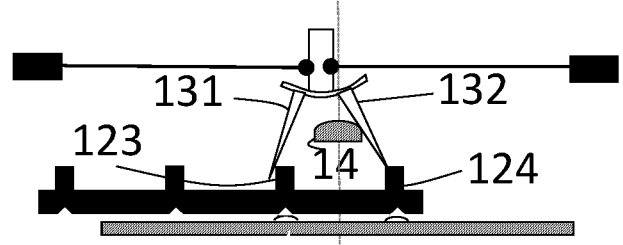

FIG. 2D shows the actuator system starting to recover in order to be able to impart a new displacement to the movable toothed rack 12, in this intermediate situation the left finger 131 is lifted by tooth 123 thanks to the one-way bending of slider 13, while the right finger 132 is still kept lifted by the stationary finger lifter 14. Therefore, in this situation the slider fingers 131 and 132 do not exert any significant force on the teeth of the toothed rack 12, whereby slider 13 can return toward the center without causing any displacement of the toothed rack 12.

Figure 2E:
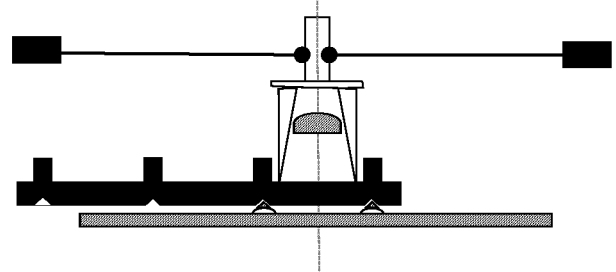

FIG. 2E shows the actuator 10 ready to cause another displacement of the toothed rack 12 towards left, if the shape memory alloy wire 15 is heated, or towards right in case of heating of the shape memory alloy wire 15'.

The vertical dotted line represent the starting position in the middle of the actuator and crosses the middle of the finger lifter 14.

The actuator shown in FIGS. 1-2E is characterized by having a distance F at rest between the slider fingers 131, 132 that is shorter than the distance T between the teeth of the toothed movable element 12 and such that the fingers can clear the teeth when lifted by the finger lifter 14. Furthermore, the length of the slider fingers, the tooth pitch P and the position of the finger lifter are designed such that the latter always remains between the fingers.

The spring-loaded pin and corresponding indentation is the most useful configuration for the releasable lock, more specifically a lock that keeps the movable toothed rack in place until a set force is applied, i.e. the SMA acting wire is supplied with current and brought over its As temperature. Other suitable examples of releasable locks can be leaf springs with metal notches, over-molded notches, rubber pins, spring-loaded steel, ceramic balls, or magnetic couplings with magnets of a first polarity fixed onto the stationary support and magnets of the opposite polarity fixed onto the movable toothed rack (or vice versa). It is important that, on at least one of the stationary support or the movable toothed rack, the magnets are at a step distance, and preferably their number is equal to the number of steps and they are at a step distance on both the stationary support and the movable toothed rack.

In an alternate but less preferred embodiment an active blocking element powered by either SMA wire, VCM or piezo is usable as releasable lock, even though this will take away one of the two technical advantages of present invention, the other one being still present and linked to the low power required to keep the SMA wires in Martensite state during equilibrium.

The above description of FIGS. 1-2E allows to explain the "engageable teeth" concept, as those two teeth that may be pushed by contraction of the pulling shape memory alloy wire in the rest position of the actuator (centered configuration of FIG. 1). Since the system is symmetric, it could be either tooth 122 to the left of slider finger 131 (in case of pulling from SMA wire 15) or tooth 123 to the right of slider finger 132 (in case of pulling from SMA wire 15').

The above description also explains why an actuator without an adequate difference between the engageable teeth distance T and the slider fingers distance F cannot work. More specifically, if T is substantially equal to F when the shape memory alloy wire 15 shortens, slider 13 will tend to move towards left, so the left finger 131 will push tooth 122, but at the same time the right finger 132 will block the movement of tooth 123 (i.e. the tooth upstream from finger 132 in the direction of movement of slider 13) once finger 132 impinges on the stationary element 14.

The present invention is not limited to a specific value of the gap G=T−F as long as it allows the slider fingers to rise, the minimum gap G being designed so that the fingers can be lifted by the finger lifter taking into the consideration the tolerances of the production process. Determination of the most suitable value for the gap G is readily discernible by a person of ordinary skill in the art by simple trigonometric evaluations. In the most simple configuration the gap G shall be at least given by the height of the teeth of the movable rack, considering that the tips of the engaging fingers in the "rest" position (as in FIG. 2A) are in contact with the movable toothed rack, but in case they are not in contact then the gap may be reduced accordingly.

Schematic views of an actuator 30 according to a second embodiment of the present invention in different actuation statuses are shown in FIGS. 3A-3C, where only the most relevant structural variants have been represented.

More in detail, as shown in FIG. 3A, actuator 30 comprises two identical movable toothed racks 32, 32' that are each driven by an identical couple of engaging fingers 331, 332 and 331', 332', with both couples of fingers connected to a same slider 33, that are lifted by identical finger lifters 34, 34'. The movement of slider 33 is driven by a couple of shape memory alloy wires 35, 35' in antagonistic configuration connected to a stationary actuator housing (not shown) via terminals 350, 350'. As already mentioned, some of the elements not necessary for the understanding of the operation of this embodiment, such as the two stationary supports and the corresponding releasable locking structures, have not been shown.

In FIG. 3B the left shape memory alloy wire 35 is in a higher actuation state, i.e. its temperature is increased above As, with respect to the right shape memory alloy wire 35', therefore SMA wire 35 pulls slider 33 to the left. As a consequence of this movement, fingers 331 and 331' move the toothed racks 32 and 32' to the left, while fingers 332 and 332' rise since impinging on the stationary finger lifters 34, 34' thanks to a hinged connection to slider 33.

FIG. 3C shows the opposite movement of the movable toothed racks 32, 32' from the initial position by means of slider 33 moving to the right due to the pull of the shape memory alloy wire 35'. The shape memory alloy wires 35 35' actuation statuses (i.e. hotter wire) in FIGS. 3B and 3C are reversed.

The second embodiment of FIG. 3 is different from the first embodiment of FIGS. 1-2E not only for the duplication of the structure through the addition of a symmetrically arranged second movable rack 32' (with the relative engaging fingers 331' and 332', stationary finger lifter 34', stationary support and releasable locking structures), but also for the distance between the fingers, that is greater than the toothed rack pitch P.

In this configuration teeth 321, 321', 322, 322' are the engageable teeth of the movable toothed elements 32, 32' in the rest position (centered configuration), but other four teeth are contained between the slider fingers. Therefore, in this case the required gap G is not simply equal to T−F but rather to 4P+T−F, and the general formula will thus be G=n*P+T−F where n is the number of teeth contained between the slider fingers at rest. This formula is also applicable to the first embodiment, taking into account that in that case n=0 (the slider fingers distance at rest F is less than the toothed rack pitch P).

The actuators according to present invention are not limited to linear configurations, as shown for example in the cross-sectional view of FIG. 4. In this case, actuator 40 has a cylindrical symmetry and the stationary element is a stationary cylindrical central support 41 coupled to a concentric movable toothed wheel/gear 42. Coupling is achieved by means of spring loaded pins 46, 46', . . . 46' that in the rest condition of FIG. 4, i.e. when the two shape memory alloys wires 45, 45' are in a balanced state (same lower temperature) are in correspondence of teeth 421, 422, . . . 42n of toothed wheel 42. Shape memory alloys wires 45, 45' are in antagonistic configuration each respectively connected to one side of slider 43 and to a stationary terminal 450, 450'.

Similarly to the first embodiment, also in this third embodiment the two engaging fingers 431, 432 have a distance F that is less than the toothed wheel distance T, with a stationary finger lifter 44 to lift the engaging finger not pushing the toothed wheel tooth, and the working principle is exactly the same of FIGS. 2A-2E translated from a linear geometry to a cylindrical one. In this configuration teeth 421 and 422 are the engageable teeth of the movable toothed element 42.

A variant of the embodiment of FIG. 4 is shown in the fourth embodiment of FIGS. 5A-5D, where also in this case actuator 50 comprises a toothed wheel 52 as movable toothed element. The position of a slider 53, that is connected to a pivotal element 52' placed in the center of the toothed wheel 52, is controlled by the action of two antagonistic shape memory alloy wires 55, 55' each connected to a stationary terminal 550, 550' and arranged in an inverted V shape to allow slider 53 to rotate around pivot 52'.

As better shown in the partial top views of FIGS. 5C and 5D, slider 53 is provided with two fingers 531, 532 that are rotatably mounted on a shaft 58 orthogonal to slider 53 and extending over the toothed wheel 52, such that a first finger 531 is located in a proximal position and a second finger 532 is located in a distal position, i.e. they can rotate independently in two different parallel planes that are orthogonal to shaft 58. A stationary finger lifter 54 is mounted on a stationary support 51 located on the opposite side of the toothed wheel 52 with respect to slider 53, and therefore not visible in the front views of FIGS. 5A, 5B. Said finger lifter 54 is substantially S-shaped in a plan view, with a central wide portion of the same width as the toothed wheel 52 and two narrow portions 541, 542 having half said width and extending respectively to the right and to the left (as seen in FIGS. 5C, 5D), in addition to a supporting portion 543 for the connection to the stationary support 51. It is noted that fingers 531, 532 are depicted in FIGS. 5C and 5D in a semi-transparent way in order to allow a better comprehension of the S shape of the finger lifter 54, and obviously the system could be made in a mirror-like way by switching the positions of fingers 531, 532 and inverting the S shape of the finger lifter 54.

More specifically, as better shown in the front views of FIGS. 5A and 5B, the two fingers 531, 532 are substantially comma-shaped and mounted on shaft 58 at their larger "heads" in an opposite arrangement with their concave sides facing each other and their thinner "tails" extending below the arcuate finger lifter 54 in the rest position of FIG. 5A, in which they abut respectively against the proximal ends of the two narrow portions 541, 542 of the finger lifter 54 and are arranged between the engageable teeth 521, 522 of the toothed wheel 52 (obviously with a sufficient gap G, as discussed above). Slider 53 is also provided with two leaf springs 53', 53" extending in an inverted V arrangement on top of fingers 531, 532 with a central mounting aligned with shaft 58, the position and inclination of said leaf springs 53', 53" being such that in the rest position of FIG. 5A they contact respectively fingers 531, 532 providing a small bias for a counter-clockwise rotation of finger 531 and a clockwise rotation of finger 532. The rotation of fingers 531, 532 is therefore completely limited in one direction by the toothed wheel 52 and partially limited in the other direction by the leaf springs 53', 53" that can be elastically deformed.

Upon actuation of the first shape memory alloy wire 55, as shown in FIGS. 5B and 5D, slider 53 is pulled to the left thus rotating counter-clockwise and this causes the first finger 531 to impinge on tooth 521 causing the unlocking of the toothed wheel 52 through the disengagement of a spring-loaded pin 56 (black dot), mounted on the stationary support 51, from one of the indentations 57 disposed along a circle inside the toothed wheel 52. The spring-loaded pin 56 allows coupling with the stationary support 51 that may have any shape (as long as it holds the finger lifter 54 and pin 56 at their correct positions) and is in a plane parallel to the toothed wheel 52.

During the movement to the left of slider 53, the second finger 532 will be lifted by the narrow portion 542 of the stationary finger lifter 54, thus rotating counter-clockwise and deforming leaf spring 53". In this way, finger 532 is located on top of the finger lifter 54 and does not interfere with the counter-clockwise rotation of the toothed wheel 52, which continues until the spring-loaded pin 56 engages the following indentation 57.

During the return stroke to restore the rest position of FIG. 5A, finger 532 slides along the narrow portion 542 while finger 531 climbs over tooth 522 by rotating clockwise and deforming leaf spring 53'. Due to the symmetry of the system, when the second shape memory alloy wire 55' is actuated for a clockwise rotation of the toothed wheel 52 the operation is the same only with reversed movements/rotations, i.e. finger 532 engages tooth 522 and finger 531 is lifted on narrow portion 541 by deforming leaf spring 53'.

The fourth embodiment of FIG. 5 has therefore these major differences with the third embodiment of FIG. 4:

A single locking pin mounted on a stationary element alternately engaging different indentations disposed in a circle on the toothed rotating element.

The stationary support and the toothed rotating element are on different planes.

The two fingers are on different planes.

The slider is mounted on a pivot of the toothed rotating element.

The present invention is not limited to the use of two linear shape memory alloy wires in antagonistic configuration, since multiple configurations for connecting them to the slider and a stationary surface are possible.

In the schematic representation of FIGS. 6A-6D the more useful ones are shown.

FIG. 6A: a single shape memory alloy wire 65 in a linear configuration between terminal 650 and element 6500 connecting it to the slider (not shown) or to an element carrying the slider, this is the simplest configuration and is the one shown in the actuator embodiments represented in FIGS. 1 to 5.

FIG. 6B: a single shape memory alloy wire 65 in a "U-shape" configuration, with its extremities connected to terminals 650, and its median portion winding around the connecting element 6500.

FIG. 6C: two shape memory alloy wires 65a, 65b converging onto the same point of the connecting element 6500; alternatively, the same drawing may represent a single shape memory alloy wire in a "V-shape" configuration with each of its portions 65a, 65b connecting terminals 650 with the same point of the connecting element 6500.

FIG. 6D: three shape memory alloy wires 65a, 65b, 65c in a stroke multiplier configuration, such as described in U.S. Pat. No. 6,574,958, with only the third SMA wire 65c having one of its extremities connected to the connecting element 6500.

The present invention is not limited to a specific way to connect the shape memory alloy wires onto the slider, more specifically the shape memory alloy wires in antagonistic configuration may be connected directly to the slider, as shown in the embodiments of FIGS. 1 to 4, or they could be connected to an element connected to the slider as in FIG. 5.

Another non-limiting example of this intermediate connection is shown in FIGS. 7A and 7B. In this case, the antagonistic shape memory alloy wires 75, 75' are aligned and connected between stationary terminals 750, 750' and a rotating arm 78 which is connected through a first pivot 78' to a stationary element (not shown), while a slider 73 is in turn connected to the rotating arm 78 through a second pivot 78". With this arrangement a stroke multiplying effect is achieved, since a contraction towards right of SMA wire 75' of an amount s1 will displace slider 73 towards left by a distance given by $s2=s1*L2/L1$, where L1 is the distance between the first pivot 78' and the alignment line of shape memory alloy wires 75, 75', and L2 is the distance between pivots 78' and 78".

Another example of intermediate connection achieving a stroke multiplying effect, similarly to what described with reference to FIGS. 7A and 7B, is shown in FIGS. 8A and 8B where the antagonistic wires 85, 85' are parallel to each other but not exactly aligned. The extremities of the first shape memory alloy wire 85 are connected to a stationary terminal 850 and to the upper portion of a first rotatable arm 88, and similarly the extremities of the second shape memory alloy wire 85' are connected to a stationary terminal 850' and to the upper portion of a second rotatable arm 89. Each rotatable arm 88, 89 is connected through a first pivot 88', 89' to a stationary element (not shown), and through a second pivot 88", 89" to a slider 83, shaped to have two downward extending fingers 831, 832 rather than have them fixed to it.

FIG. 8B shows the system under the traction action of shape memory alloy wire 85, such that arm 88 rotates clockwise around pivot 88'. The other shape memory alloy wire 85' does not exert any force on the second arm 89, which is therefore also rotated clockwise around pivot 89' due to the movement towards left of slider 83 transmitted through the two second pivots 88" and 89".

A third example of intermediate connection is shown in FIGS. 9A and 9B, in which a slider 93 is orthogonally fixed to a movable support 92 on the side thereof facing a stationary element 91 parallel thereto. Two inclinable structures 96, 97 are arranged orthogonally between said elements 91, 92 at a position close to the ends thereof, and they are connected thereto through two respective pairs of flexures 961, 961' and 971, 971' that are parallel to the inclinable structures 96, 97. Other two respective pairs of flexures 962, 962' and 972, 972' that are orthogonal to the inclinable structures 96, 97 connect them to the stationary element 91 and to slider 93 respectively. A pair of antagonistic shape memory alloy wires 95, 95' are connected respectively between terminals 950, 950' mounted on the stationary element 91 and the extremities of the inclinable structures 96, 97 proximal thereto, said wires 95, 95' being arranged in parallel to the second pairs of flexures 962, 962' and 972, 972'.

FIG. 9A shows slider 93 in its "rest" position, while FIG. 9B shows how the slider guiding system is changed under the action of the shape memory alloy wire 95, i.e. upon its shortening. In this case, the proximal extremity of the inclinable element 96 is pulled toward the stationary element 91 such that all flexures will bend and exert a force. The combined effect of the flexures results in the inclination of the second inclinable element 97 substantially in parallel to the first inclinable element 96, and in the parallel displacement of the movable support 92 with respect to the stationary element 91.

It is to be underlined that FIG. 9A shows just an exemplary configuration for driving slider 93 through the combined effect of shape memory alloy wires in antagonistic configuration and elastic elements. The present invention is therefore not limited to the type of elastic element (flexure) or their disposition, as a person skilled in the art can easily and with no inventive exercise immediately devise alternate driving configurations based on this principle. For example, standard coil springs may replace the flexures, and the disposition could be changed from square/parallel, as shown in FIG. 9A, to inclined/rhombic with two vertices on the inclinable elements 96 and 97, one vertex onto the stationary element 91, one vertex onto the movable support 92.

The present invention is not limited to a specific type of shape memory alloy wires, even though from a geometrical point of view are usefully used SMA wires with a diameter comprised between 25 μm and 500 μm. In this respect, it is important to underline that as the shape memory alloy wires are real objects, depart from a circular section is possible, therefore the term diameter is to be intended as the diameter of the smallest enclosing circle.

Even though the present invention is not limited to any specific shape memory alloy, preferred is the use of Ni—Ti based alloys such as Nitinol that may exhibit alternately a superelastic behavior or shape memory alloy behavior according to its processing. The properties of Nitinol and methods allowing to achieve them are widely known to those skilled in the art, see e.g. the article "A Study of the Properties of a High Temperature Binary Nitinol Alloy Above and Below its Martensite to Austenite Transformation Temperature" by Dennis W. Norwich presented at the SMST 2010 conference.

Nitinol may be used as such or its characteristics in terms of transition temperature may be tailored by adding elements such as Hf, Nb, Pt, Cu. The proper choice of material alloy and its characteristics are commonly known by a person those skilled in the art, see for example:

http://memry.com/nitinol-iq/nitinol-fundamentals/transformation-temperatures

Also, the shape memory alloy wires may be used "per se" or with a coating/sheath to improve their thermal management, i.e. their cooling after being actuated. The coating sheath may be uniform, such as described in U.S. Pat. No. 9,068,561 that teaches how to manage residual heat by resorting to an electrically insulating coating which is a heat conductor, while U.S. Pat. No. 6,835,083 describes a shape memory alloy wire having an enclosing sheath capable to improve cooling after every actuation cycle. Also a coating made with or containing phase changing materials, as described in U.S. Pat. No. 8,739,525, may be advantageously employed.

Actuators according to present invention are most advantageously used in applications requiring adjustments with high force and limited space where fast speed of response is not an issue or a critical aspect to deal with. They can replace step-motor actuators where a gear box is attached for force reasons, or they can be used in fluidic and air flow management for thermal control applications, and another interesting field of use is to move elements in antennas to modify the beam direction and form. Notwithstanding the above, since the device size is scalable to micro-scale or macro-scale, other applications in consumer electronics and medical industries are feasible.

The invention claimed is:

1. A stepwise discrete actuator, comprising:
a stationary support;
a movable toothed element with a constant tooth pitch P defining a step distance for the actuator discrete steps;
a slider for moving said movable toothed element through two fingers that alternately engage its teeth;
a stationary finger lifter configured to lift that of said two slider fingers that does not engage the movable toothed element;
two shape memory alloy wires connected in an antagonistic configuration, each of which is connected between a stationary terminal at a first end and said slider or an intermediate element connected to the slider at a second end, so as to drive the slider,
wherein
said stationary support is coupled to the movable toothed element by means of releasable locking structures arranged at said step distance P from each other,
the slider is structured such that it can only deform so as to move away from the movable toothed element but not towards it,
the lift performed by said stationary finger lifter is caused by the movement of the slider upon actuation of one of the two shape memory alloy wires and is allowed by a gap G along the direction of movement of the slider between said slider finger that is being lifted and the tooth upstream therefrom along said direction, such that said slider finger can clear the teeth of the movable toothed element, and
wherein said gap is calculated as G=n*P+T−F, where
n is the number of teeth contained between the slider fingers at rest,
P is the tooth pitch/step distance,
T is the distance between two adjacent teeth, and
F is the distance between the slider fingers at rest.

2. The stepwise discrete actuator according to claim 1, wherein said releasable locking structures are spring-loaded pins that engage corresponding indentations.

3. The stepwise discrete actuator according to claim 2, wherein said spring-loaded pins are fixed on the stationary support and the indentations are formed in the movable toothed element.

4. The stepwise discrete actuator according to claim 1, wherein the movable toothed element is a linear rack.

5. The stepwise discrete actuator according to claim 4, wherein it further comprises a second stationary support, a second movable toothed element, a second couple of fingers that alternately engage the teeth of said second movable toothed element and are mounted on the same slider as the first couple of fingers, a second stationary finger lifter and a second set of releasable locking structures that couple said second stationary support to the second movable toothed element, all of said further second components being identical with the corresponding first components and arranged symmetrically thereto.

6. The stepwise discrete actuator according to claim 1, wherein the movable toothed element is a toothed wheel.

7. The stepwise discrete actuator according to claim 1, wherein the shape memory alloy wires are connected to an intermediate element that is a lever providing a stroke-multiplier effect.

8. The stepwise discrete actuator according to claim 1, wherein each of the shape memory alloy wires has its extremities connected to stationary terminals and a median portion connected to a connecting element that connects it to the slider or to an element carrying the slider.

9. The stepwise discrete actuator according to claim 1, wherein each of the antagonistic shape memory alloy wires is made of a series of shape memory alloy wires connected in a stroke multiplier configuration.

10. The stepwise discrete actuator according to claim 1, wherein the shape memory alloy wires act on intermediate inclinable elements connected through elastic elements to the slider, said elastic elements being flexures or coil springs.

11. The stepwise discrete actuator according to claim 1, wherein the number of teeth per toothed movable element is comprised between 3 and 30.

12. Use of a stepwise discrete actuator according to claim 1 in flow management devices or devices for the orientation or form adjusting of antennas.

13. The stepwise discrete actuator according to claim 11, wherein the number of teeth per toothed movable element is comprised between 8 and 25.

* * * * *